United States Patent [19]

Ilves

[11] Patent Number: 5,227,052
[45] Date of Patent: Jul. 13, 1993

[54] WATER CONDITIONING APPARATUS HAVING REACTION PLATES COUPLED TO AN ASTABLE OSCILLATOR

[76] Inventor: Juhani E. Ilves, 1418 Lakeview Dr., Lake Worth, Fla. 33461

[21] Appl. No.: 800,438

[22] Filed: Nov. 29, 1991

[51] Int. Cl.⁵ .............. B01D 17/12; C02F 1/48
[52] U.S. Cl. .................... 210/143; 204/228; 204/275; 204/400; 210/169; 210/188; 210/243
[58] Field of Search ............... 204/228, 229, 242, 247, 204/302, 305, 222, 223, 232, 244, 245, 269, 149, 275, 400; 210/85, 143, 192, 243, 748, 188, 169, 121, 122; 422/186.04, 186.07, 186.15, 186.16

[56] References Cited

U.S. PATENT DOCUMENTS

| | | | |
|---|---|---|---|
| 3,654,119 | 4/1972 | White et al. | 204/228 |
| 3,770,605 | 11/1973 | McCoy | 204/305 |
| 3,847,787 | 11/1974 | Okazaki et al. | 204/229 |
| 4,472,278 | 9/1984 | Suzuki | 204/302 |
| 4,680,114 | 7/1987 | Hayes | 210/243 |
| 4,719,018 | 1/1988 | Przybylski | 210/243 |
| 4,790,923 | 12/1988 | Stillman | 204/269 |
| 4,936,979 | 6/1990 | Brown | 210/243 |
| 4,946,574 | 8/1990 | Lin | 204/229 |
| 4,986,906 | 1/1991 | Dadisman | 210/243 |

FOREIGN PATENT DOCUMENTS

| | | | |
|---|---|---|---|
| 2554679 | 5/1985 | France | 210/169 |
| 61-54279 | 3/1986 | Japan | 204/305 |
| 1126544 | 11/1984 | U.S.S.R. | 204/305 |

Primary Examiner—Joseph W. Drodge

[57] ABSTRACT

A water condition apparatus having a water conditioning system for water or any other similar liquid cleaning, where the water conditioning system includes an adjustable control unit, with a power supply, and a reaction cell with inlet and outlet pipes for connecting it to the waterline to be cleaned, and having reaction plates inside the reactor cell for changing the Hydrogen Ion concentration, and having a boundary wall between the reaction plates for dividing the gas bubbles that are formed during the reaction and of which the wanted ones can be removed into the air, and having a gas liberator for removing the gas bubbles formed during the reaction. The Adjustable control unit will be manually adjusted to cause either a Hydrogen Ion concentration's rise or decline, or the adjustable control unit will be computer directed, when the state of the water can be measured by the computer and so the Hydrogen Ion concentration will be adjusted automatically in the wanted direction or is unchanged and only precipitation is caused. The changing of the Hydrogen Ion concentration is done by the discharge action of the positive and negative ions using electric current and by removing excess gas from the substance through the gas liberator to the outside air.

15 Claims, 6 Drawing Sheets

POSITIVE REACTION PLATE

FIG. 15

NEGATIVE REACTION PLATE

WATER CONDITIONING APPARATUS HAVING REACTION PLATES COUPLED TO AN ASTABLE OSCILLATOR

1. TECHNICAL FIELD

This invention relates to a method for changing the condition of water, or any other similar liquid, to be cleaned of any sediment or contaminants, and kill unwanted germs, bacteria and viruses, without adding any dangerous liquids, such as chlorine, an acid or a base, or any other substance.

2. BACKGROUND ART

Generally, for treatment of water or any other similar liquid, chlorine is used for killing the bacteria, and an acid or a base is used for adjusting the pH-value. All of these chemicals are dangerous substances and will cause damage to the human body if contact has occurred or if evaporated gas is inhaled. Also when the waste backwash water of a filter is released to the environment, it will cause pollution.

3. DISCLOSURE OF INVENTION

It is an object of this invention to provide a method for cleaning water or any other similar liquid without adding any chemicals, by using electric current for changing water condition It is another object of this invention to provide a method for cleaning water or any other similar liquid at very low cost, much less expensive than with chlorine, an acid and a base, by using minimal electric energy.

It is a further object of this invention to provide minimal pollution by backwash water from the filter, by using electric current to change water condition, thereby adding of polluting chemicals is not necessary.

It is another object of this invention to provide a much shorter circulating time than the traditional method of cleaning swimming pool water, by using electric current for changing the waters condition so that quicker precipitation will occur.

It is another object of this invention to provide a considerably more effective method to kill germs, bacteria and viruses that are not attacked by chlorine, by using electric current to produce ozone for that task.

It is another object of this invention to provide a water disinfection system which is economical and easy to install.

It is another object of this invention to provide a water cleaning method that does not leave chemical residues to the cleaned water or to the cleaning filter.

It is another object of this invention to provide a water cleaning method that does not produce any chlorine gas which will destroy the ozone layer in the atmosphere.

It is another object of this invention to provide a water cleaning method that does not produce any objectionable odor, or taste in the cleaned water. Pure water does not have any odor or taste which comes from contaminants in water. No any chemicals with odor or taste are used, and odor and taste caused contaminants are filtered out.

It is another object of this invention to provide a clear, totally effective chemical-free water for allergic skin or eyes.

It is another object of this invention to provide an apparatus which needs only a minimum of maintenance.

A common problem with cleaning water, or other similar liquid, or solution is that the pH-value of the liquid is high (base) or low (acid). Now, when it is neutralized, a substance of opposite pH-value is added which makes the whole solution more impure. After neutralization the waste water is released to the environment, mostly to the sea, lakes or rivers. When the dumping capacity of above mentioned place is exceeded, dramatic pollution has occurred. Also when unwanted bacteria is to be killed, for example in a swimming pool, and when drinking water is treated, chlorine is used. After that, acid addition is necessary because chlorine will raise the pH-value. These are methods that are generally used today. Also in a swimming pool stabilizer chemicals are needed. It is also known that chlorine gas is one of the most dangerous poisonous gases.

One advantage of this inventions is that it will change a liquids pH-value in the desired direction and at the same time the generated ozone will kill the unwanted germs, bacteria and viruses, while the contaminant precipitation begins and as the liquid is driven through a generally used filter the cleaning is increased dramatically. Therefore adding of chemicals is not even necessary. Useful applications of this invention are cleaning swimming pool water, cleaning drinking water and cleaning waste water and other similar liquids.

Change in the hydrogen ion concentration and contaminants precipitation is a result of the following reaction: When an electric current is directed to the reaction plates, the water molecules are broken up and hydrogen, $H_2$-molecules are formed on one of the reaction plate and on the other reaction plate ozone $O_3$ is formed momentarily and then changed into the basic molecule of oxygen $O_2$. Since the electric current is continuous therefore the presence of ozone is continuous. Also when the electric current is present, it will discharge the ion charge from the $OH^-$ ions and $H_3O^+$ ions, and then them will change into a water molecule. This reaction therefore changes the hydrogen ion concentration. The excess Hydrogen molecules $H_2$'s formed during the reaction are directed out of the reaction cell through the gas exhaust pipe to the gas separation closure and through that way to the air outside. The ozone and oxygen molecules formed on the left side on the reaction cell, stay in the water and its circulation and cause a situation of excess oxygen and this way the hydrogen ion concentration is lowered.

The case is opposite when the polarity of the current is reversed and the extra formed $O_2$-molecules are directed out of the reaction cell through gas exhaust pipe to the gas separation closure and through that way to the air outside, The ozone and hydrogen molecules formed on the left side on the reaction cell, stay in the water and its circulation and cause a situation of excess hydrogen and this way cause an opposite change in the hydrogen ion concentration, in other words rising.

Ozone works as a substance opposing live germs, bacteria and viruses, and substitutes the use of chlorine and at the same improves the atmosphere, when instead, chlorine vaporizes into the air as a pollutant and kills the ozone layer necessary for human life.

DESCRIPTION OF THE PREFERRED EMBODIMENT

Figure 1:
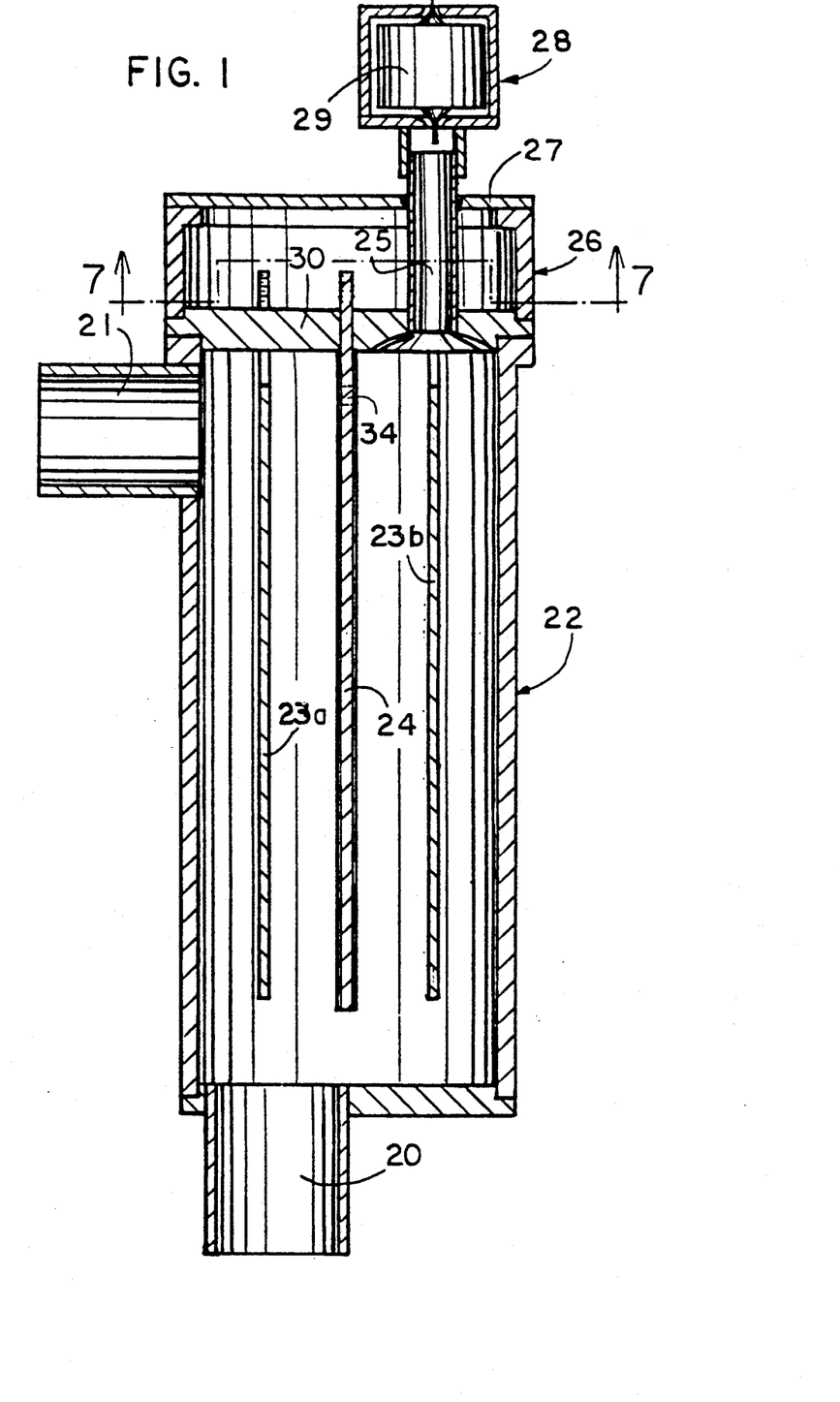
FIG. 1 is a sectional side view of the reaction cell.

This Water Conditioning Apparatus, has a reaction cell 22 shown in section FIG. 1.

The liquid about to be cleaned goes in an inlet pipe 20 to reaction cell 22 where there are two reaction plates 23a and 23b and a boundary wall 24 which prevents the gas bubbles which are formed during the reaction from uniting. The gas bubbles formed on the surface of the reaction plate 23a, travel through the left side of the reaction cell with the flowing liquid straight into the outlet pipe 21 and then go into the filters liquid flow.

Figure 2:
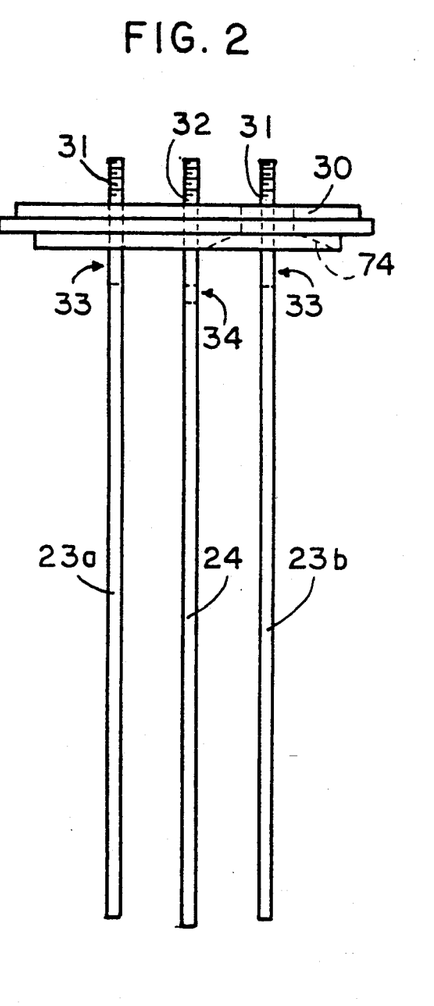
FIG. 2 shows the reaction plates and boundary wall therebetween, which are attached to the lid of the reaction cell.
Figure 3:
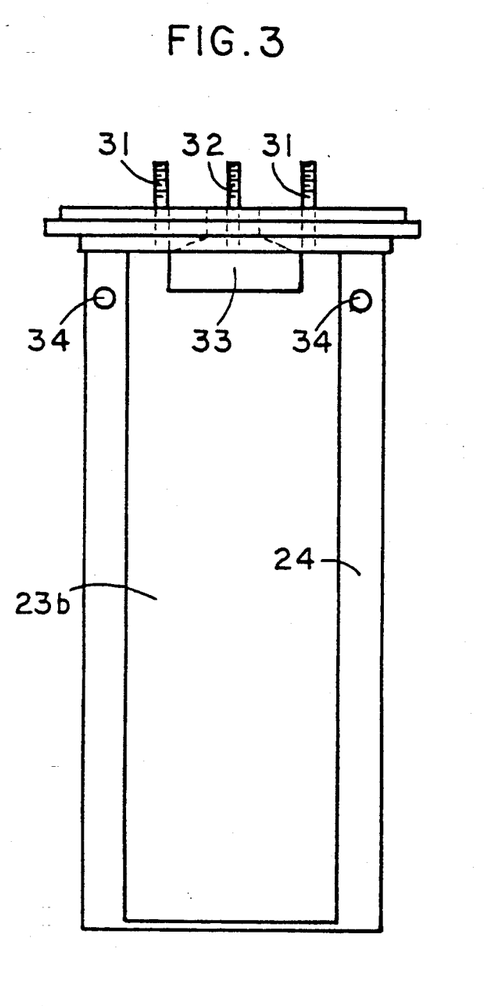
FIG. 3 is a side view of FIG. 2.

In FIG. 2 the plates 23a and 23b are shown, which are attached to the top of the reaction cell lid 30. Also FIG. 2 shows the boundary wall 24 and the two holes 34 at the top of it through which the liquid can flow to provide a very slow water flow on the right side. FIG. 2 and FIG. 3 shows the terminal screws 31 and 32 which are electrical connectors of reaction cell 22 for Driving and Computerized Measurements.

Figure 4:
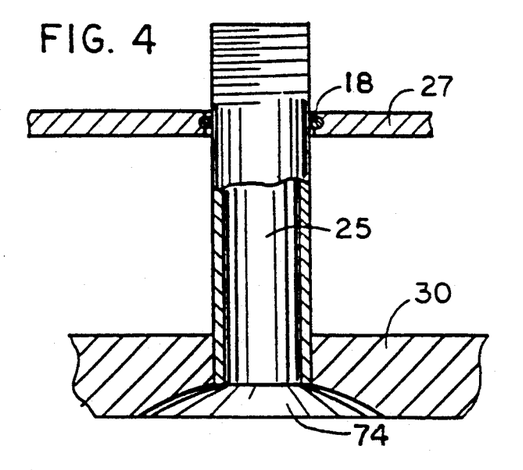
FIG. 4 shows an enlarged view of the gas exhaust pipe.
Figure 5:
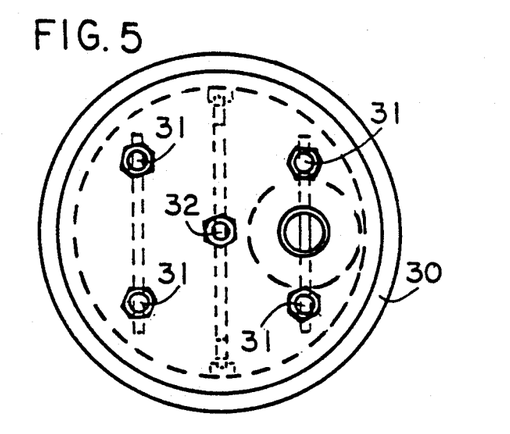
FIG. 5 is a top view of FIG. 2 with nuts added, boundary wall gasket added and gas exhaust pipe added.
Figure 6:
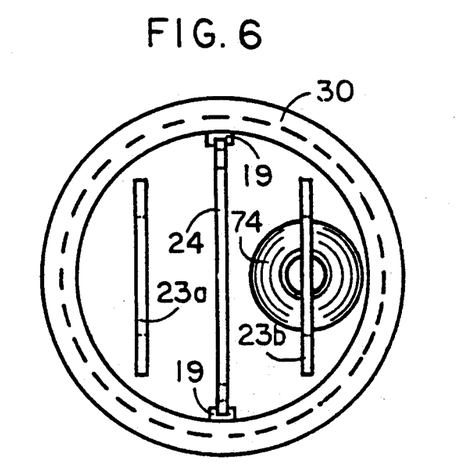
FIG. 6 is a bottom view of FIG. 5.
Figure 9:
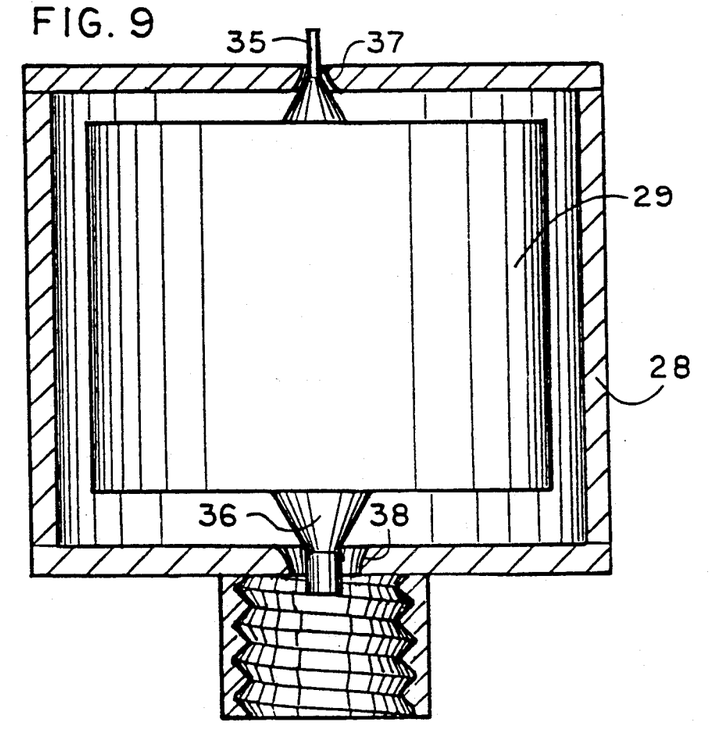
FIG. 9 shows an enlarged view of the gas liberator closure.
Figure 10:
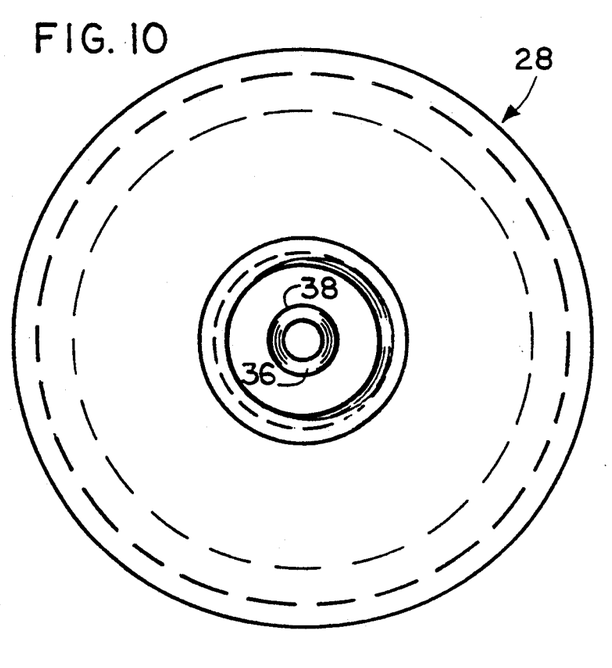
FIG. 10 shows a bottom view of FIG. 9.

The aperture 33 is made for improved liquid and gas flow on both sides of reaction plates 23a and 23b, and there is a gasket 19 on both side edges of boundary wall 24. Correspondingly on the other side of the boundary wall 24, the right side, as seen in FIG. 1, the gas bubbles formed on the surface of reaction plate 23b rise up and end up in pipe 25, seen in FIG. 4, which goes through the reaction cell lid 30 and through the electronics terminal connection box 26, seen in FIG. 1, to the gas liberator closure 28. The gas liberator closure 28, seen in FIG. 9 and FIG. 10, is equipped with two needle valves 35 and 36. FIG. 4 shows the conical collector 74 for the gas bubbles and the pipe 25 through which the gas bubbles from the right side of reaction cell go to the gas liberator closure 28. Also gasket 18 seals the hole of the pipe to stop rainwater from getting inside the electrical terminal connection box 26.

When the level of liquid rises in the gas liberator closure 28, the gas inside is pushed out through the top aperture 37, the float 29 rises and the needle valve 35 at the top closes the aperture 37. When the gas bubbles formed on the surface of the reaction plate 23b rise, they pass into the closure and the level of liquid begins to decline and the top valve 35 opens and the gases exit through the aperture 37. If the level of liquid still keeps declining the float 29 will close the bottom aperture 38 with the needle valve 36. The advantage of the float closure is that air can not get into the system when the pump is turned off and a vacuum is formed in the system.

Figure 7:
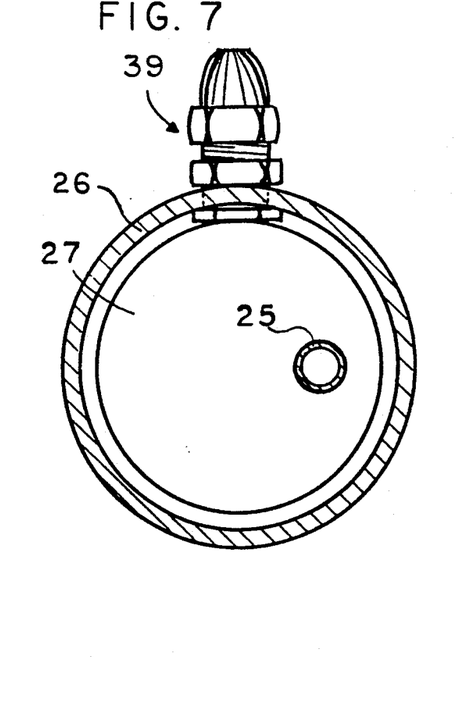
FIG. 7 is a view taken along line 7—7 of FIG. 1.
Figure 8:
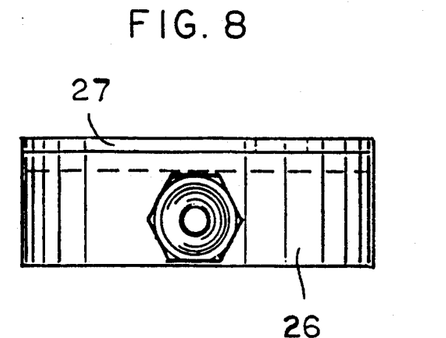
FIG. 8 is a top view of FIG. 7 without the pipe.
Figure 11:
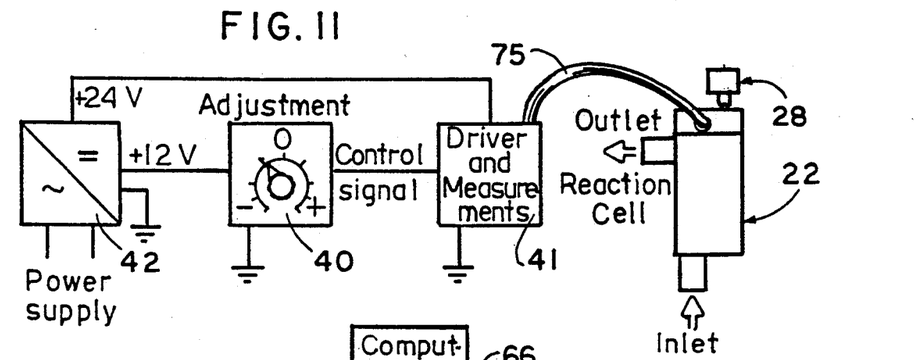
FIG. 11 shows a schematic diagram of the invention.

FIG. 7 is a bottom view of the electrical terminal connection box 26, taken along line 7—7 of FIG. 1, and shows the lid 27 of the electrical terminal connection box and also strain relief connector 39 for the cable 75 in FIG. 11.

FIG. 11 is a schematic diagram of the invention. The power supply 42 is a regular type of power supply and will feed needed voltages 12 Vdc and 24 Vdc to the control section 40 and to the reactor driver 41. Adjustment is for selecting the desired rate of proportion between positive and negative reaction time interval. Driver and measurements unit 41 is connected to the reaction cell 22 by using shielded five conductor cable 75 where the conductors A, B and C, shown in FIG. 12 are for measuring the EMF or any other electrochemical value from reaction cell 22 by using computerized measurement device, and F and G are for the connection of the driver signal to the reaction plates 23a and 23b.

Figure 12:
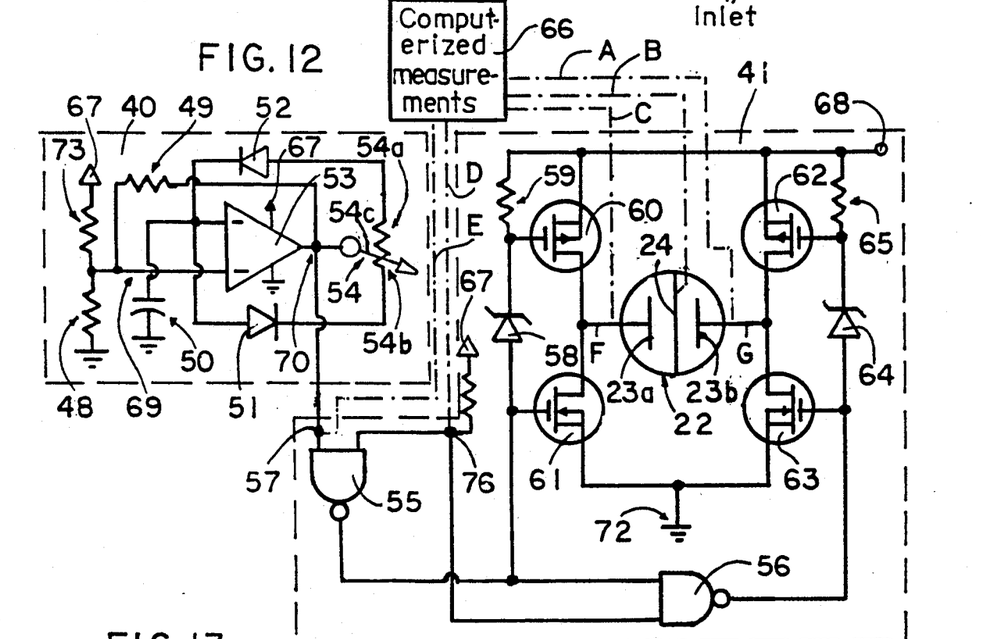
FIG. 12 shows a 100% proportional control section and the reactor driver and its connection to a computer for measuring and controlling.

In FIG. 12 is shown control section 40 and the reactor driver 41 and the connection of a computer for measuring and controlling. Control section 40 is a 100% proportional adjusted square wave astable oscillator of which the active component is an operational amplifier 53. The circuits reference point 69 is made with two resistors 73 and 48. The oscillation of circuit 53 is done by positive feedback which is produced with a resistor 49. With the circuit connections a ratio adjusted astable oscillator is made, in which there are different length positive and negative oscillation times, which is achieved by two reversed diodes 51 and 52. The total cycle time depends on the time constant set by the potentiometer 54 and capacitor 50, $[M\Omega] \times [\mu F] = [s]$. The positive oscillation time is determined by the resistance of part 54a of potentiometer 54. If the slide 54c of the potentiometer 54 is at the end of 54a, then the positive oscillation time is minimal, about zero, and the negative oscillation time is at maximum, which is about the same as the total cycle time. Correspondingly if the slide 54c of the potentiometer 54 is at the end 54b the oscillation times are reversed, so the positive oscillation time is maximum and the negative oscillation time is minimal, about zero. Therefore the ratio of positive and negative oscillation times are adjusted using potentiometer 54. The control signal produced like this is then directed from point 70 through the two NAND-gates 55 and 56 into the alternation bridge switch 41. The signal comes into the NAND-gate 55 whose output directs FET-switch 61 to be ON or OFF and correspondingly FET-switch 60 goes OFF or ON. This same directing signal is inverted with NAND-gate 56, whose reverse output is used to direct FET-switch 63 OFF or ON and at the same time FET-switch 62 ON or OFF. Resistor 59 will connect the control voltage for FET-switch 60 when FET-switch 61 is OFF and zener-diode 58 is used for dropping the control voltage down when FET-switch 61 is ON. Correspondingly resistor 65 will connect the control voltage for FET-switch 62 when FET-switch 63 is OFF and zener-diode 64 is used for dropping the control voltage down when FET-switch 63 is ON. This technique will make sure that the FET-switches on same side never can be ON at the same time.

NAND-gates 55 and 56 are also switchable, with the conductors D, in point 76, and E, in point 57, from Computerized measurements section 66 during measuring.

The bridge switch 41 achieved like this works in the following way, when fet-switch 60 is ON, FET-switch 61 is OFF, FET-switch 62 is OFF and FET-switch 63 is ON. This way the reaction cell's 22 left side reaction plate is connected to the common point 72 and the cell's right side reaction plate is connected to the +24 Vdc point 68.

When fet-switch 61 is ON, FET-switch 60 is OFF, FET-switch 63 is OFF and FET-switch 62 is ON. This way the reaction cell's 22 right side reaction plate is connected to the +24 Vdc point 68 and the cell's left side reaction plate is connected to the common point 72.

Figure 13:
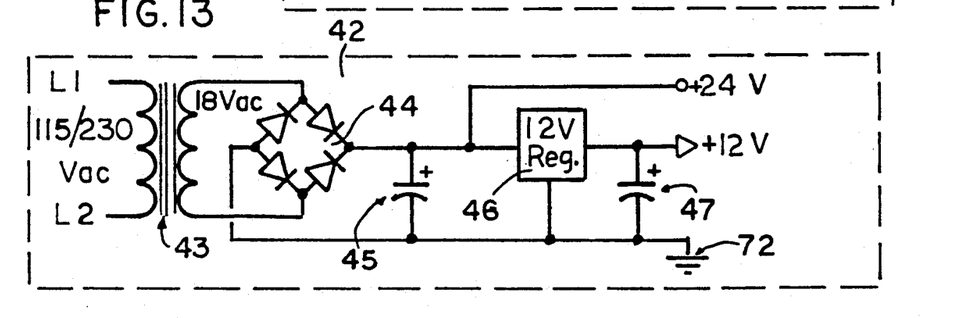
FIG. 13 shows a traditional power unit for the invention.

In FIG. 13 shown a traditional power unit 42 done using basic circuits. Line voltage will be either 120 Vac or 240 Vac. Transformer 43 decreases and isolates the line voltage to 18 Volts ac, bridge rectifier 44 converts it to DC and electrolytic capacitor 45 filters the rectified alternating voltage to 24 Vdc, which is used for the reaction cells drivers feeding 68. Regulator 46 and electrolytic capacitor 47 stabilize and reduce 24 Vdc to 12 Vdc which feeds the drivers controller 40 and NAND-gates 55 and 56 at point 67.

Figure 14:
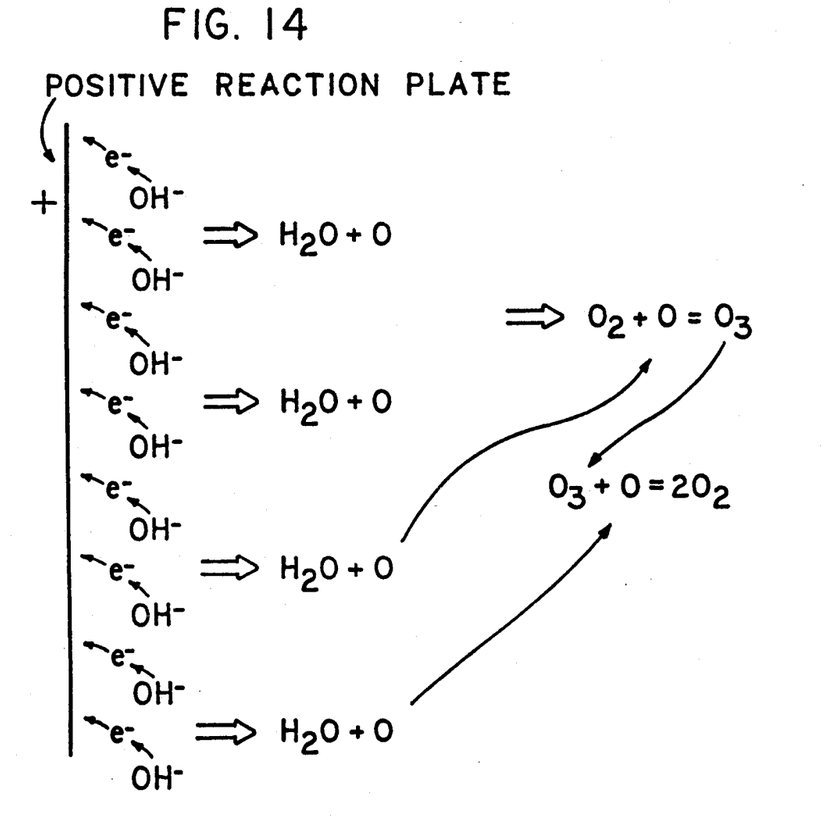
FIG. 14 shows one sequence of electrochemical reaction in which an $OH^-$ ion is discharged and form an oxygen $O_2$-molecule and ozone $O_3$-molecule.

FIG. 14 shows one sequence of electrochemical reaction around the positive reaction plate when the $OH^-$ ion is discharged. The positive electric current will discharge $OH^-$ ions and when THE first two are discharged, it will form one water molecule $H_2O$ and release first O, oxygen atom. When second two $OH^-$ ions are discharged, therein the $H_2O$-molecule is formed and second O-atom is released. Now first and second O-atom together, will form an oxygen molecule $O_2$. When next O-atom is released by described means above, it will form ozone molecule $O_3$. And next the same way released O-atom will cause $O_3$-molecule to break off and all of these together will form two $O_2$-molecules.

Figure 15:
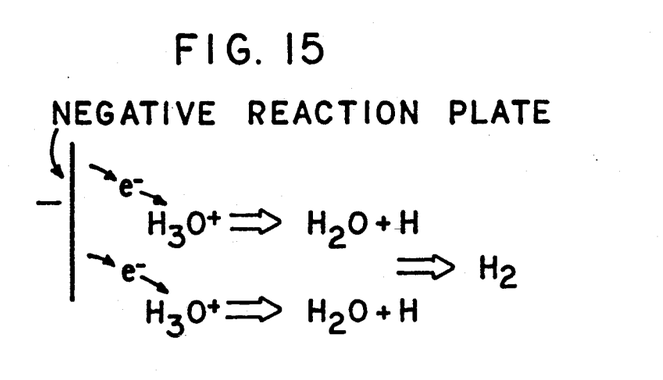
FIG. 15 shows one sequence of electrochemical reaction in which an $H_3O^+$ ion is discharged and a hydrogen $H_2$-molecule is formed.

FIG. 15 shows one sequence of electrochemical reaction around the negative reaction plate when the $H_3O^+$ ions are discharged. The negative electric current will discharge $H_3O^+$ ions and when the first $H_3O^+$ ion is discharged with negative electric charge $e^-$, it will form one water molecule $H_2O$ and release first H, hydrogen atom. When secured $H_3O^+$ ion is discharged, therein the $H_2$-molecule is formed.

What is claim is:

1. A water conditioning apparatus comprising: a reaction cell having a reaction chamber with an inlet and outlet allowing water to be treated to enter and exit respectively, the cell including a boundary wall (24) separating the reaction chamber into two portions, said boundary wall having holes (34) allowing a limited flow of water between the two chamber portions, a first reaction plate mounted in one portion of the chamber, a second reaction plate mounted in the other portion of the chamber, a control means including an astable oscillator having an output connected with the first and second reaction plates, said astable oscillator being proportionally adjustable to vary the duration and symmetry of the positive and negative phases of the oscillator output which control the proportion of ions discharged and gases generated at the reaction plates of the cell, wherein the astable oscillator has a bridge circuit, said bridge circuit having four branches, a transistor in each branch of the bridge circuit connected with the first and second reaction plates.

2. A reaction cell for a water conditioning apparatus, said reaction cell having a reaction chamber, said reaction chamber having an inlet at one end for water to be treated and an outlet at the other end for treated water, said reaction cell including a boundary wall separating the reaction chamber into a first section and a second section, a first reaction plate mounted in the first section of the reaction chamber, a second reaction plate mounted in the second section of the reaction chamber, said inlet boundary wall and plates being arranged for directing water entering the chamber to be treated directly to both sections of the reaction chamber at the one end of the reaction chamber and to flow around each first and second reaction plate, said outlet being connected to the first section at the other end of the reaction chamber for directing treated water therefrom, said reaction plates being coupled with an astable oscillator.

3. A reaction cell as set forth in claim 2 wherein said boundary wall has an opening means at the other end of the reaction chamber for a limited flow of water between the two chamber sections.

4. A reaction cell as set forth in claim 2 wherein said reaction chamber has a vent means at the other end for gas to exit, said vent means being connected to the second section at the other end of the reaction chamber for directing gas therefrom.

5. A reaction cell as set forth in claim 2 wherein said reaction cell has a terminal connection box connected thereto, each reaction plate having an electrical connector extending into said terminal connection box for being connected to a control means.

6. A reaction cell as set forth in claim 5 wherein said reaction cell has a terminal connection box connected thereto, said boundary wall having an electrical connector extending into said terminal connection box for being connected to a control means.

7. A reaction cell as set forth in claim 2 wherein means attach said first and second reaction plates to the reaction cell within said reaction chamber, said first and second reaction plates having opening means adjacent said attaching means to also have flow around said reaction plates at that location.

8. A water conditioning apparatus comprising a reaction cell, said reaction cell having a reaction chamber, said reaction chamber having an inlet at one end for water to be treated and an outlet at the other end for treated water, said reaction cell including a wall means separating the reaction chamber into a first section and a second section, a first reaction plate mounted in the first section of the reaction chamber, a second reaction plate mounted in the second section of the reaction chamber, said inlet directing water to be treated to both sections of the reaction chamber at the one end of the reaction chamber to flow around each first and second reaction plate, said outlet directing water from the first section of the reaction chamber, and a control means including a square wave astable oscillator having an output with positive and negative phases connected with the first and second reaction plates for discharging ions and generating gases, said astable oscillator being proportionally adjustable to vary the duration and symmetry of the positive and negative phases of the oscillator output which control the proportion of ions discharged, and gases generated, at the reaction plates of the cell.

9. A water conditioning apparatus as defined in claim 8 wherein the astable oscillator has a 100% proportional adjustment, said astable oscillator having an operational amplifier and reversing diodes for providing different values of feedback of positive and negative polarity time to generate a 100% adjustability of porportional adjusting of said polarity times of said astable oscillator.

10. A water conditioning apparatus as defined in claim 8 wherein said astable oscillator is a 100% proportional adjustable astable oscillator for creating a driving signal to the reaction plates, and means to adjust said proportion of said driving signal from 100% negative to 100% positive.

11. A water conditioning apparatus as defined in claim 8 wherein the reaction cell further includes venting means for liberating gas from said second section of the reaction chamber, said venting means including a venting chamber having an upper aperture and a bottom aperture, said venting chamber having a float, said float having a needle valve on top for closing said upper aperture of said venting chamber to stop the escaping of anything else besides the gas from the apparatus, said float having a needle valve on the bottom of said float for closing the bottom aperture of said venting chamber to stop air from getting in the apparatus.

12. A water conditioning apparatus as set forth in claim 8 wherein said wall means has opening means at the other end of the reaction chamber for a limited flow of water between the two chamber sections while preventing gases from said reaction plates from uniting.

13. A water conditioning apparatus as set forth in claim 8 wherein the reaction cell further includes venting means in the second section of the reaction chamber for venting said gases generated therein on the second reaction plate.

14. A water conditioning apparatus as set forth in claim 8 wherein the astable oscillator has a bridge circuit, said bridge circuit having four branches, a transistor in each branch of the bridge circuit being connected with the first and second reaction plates to apply the desired negative or positive d.c. current to the appropriate first and second reaction plates.

15. A water conditioning apparatus as set forth in claim 8 wherein the condition of the water being treated is analyzed by a computer, said computer having means for measuring the EMF-value of said first reaction plate of the reaction cell in reference to said wall means, said computer having means for measuring the EMF-value of said second reaction plate of the reaction cell in reference to said wall means, said computer having means for measuring the EMF-value of said first reaction plate of the reaction cell in reference to said second reaction plate of the reaction cell.

* * * * *